July 23, 1940.　　　P. RENFREW　　　2,208,686
LIQUID FLOW CONTROL APPARATUS
Filed May 3, 1938
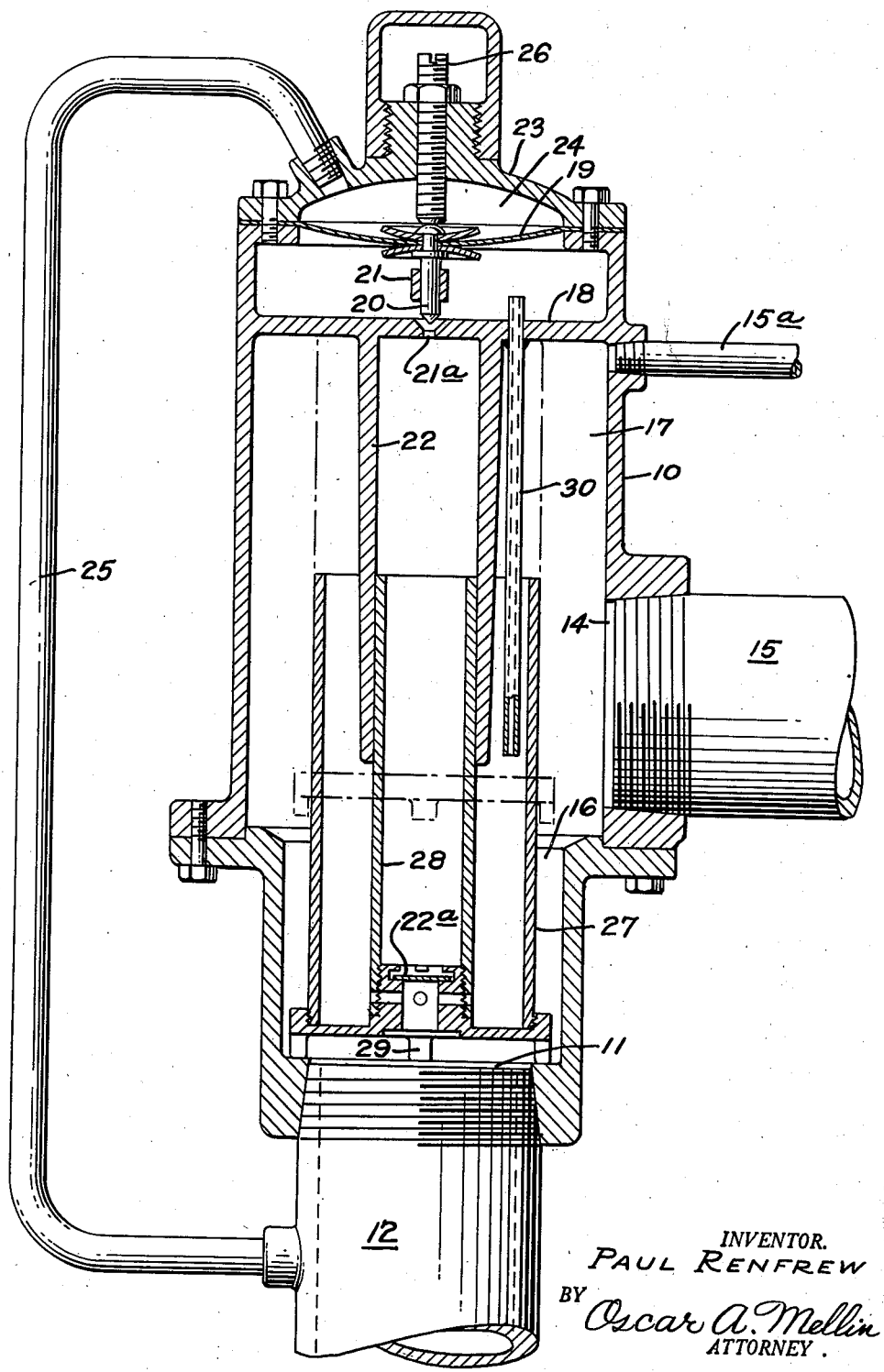
INVENTOR.
PAUL RENFREW
BY Oscar A. Mellin
ATTORNEY.

Patented July 23, 1940

2,208,686

UNITED STATES PATENT OFFICE 2,208,686

LIQUID FLOW CONTROL APPARATUS

Paul Renfrew, Berkeley, Calif., assignor to Ralph N. Brodie Company, Oakland, Calif., a corporation of California Application May 3, 1938, Serial No. 205,871

5 Claims. (Cl. 138—46)

This invention relates to the separation of air from liquid in liquid metering systems, and particularly pertains to an apparatus for retarding the flow of liquid in such systems at the commencement and end of the flow of liquid to enable separation to be properly effected at such periods.

It has been found desirable in liquid metering systems to employ air eliminators which contain a relatively small volume of liquid. Due to the fact that the proportion of air to liquid in the line is considerably greater at the commencement and termination of the flow of liquid in such systems, difficulty has been encountered in properly eliminating the air at such periods with the use of eliminators containing a relatively small volume of liquid. This is due in the main to insufficient time in which to effect the elimination during the liquid flow through the eliminator.

It is the principal object of my present invention to provide a simple and effective apparatus to retard or restrict the flow of fluid from a tank to an air eliminator at the commencement and termination of the liquid flow to an extent sufficient to permit proper elimination of the air in the fluid by an air eliminator containing a relatively small volume of liquid.

In actual practice I accomplish this object by providing an apparatus interposed in the line between the tank and the air eliminator. This apparatus includes a housing having an inlet port connected with the tank and an outlet port connected with the air eliminator. In the housing intermediate these ports is a control port which is normally restricted by a member adapted to move along the line of liquid flow so that it may be moved to a position where it will not restrict the control port by incoming fluid. This movement of the member is yieldingly resisted by a dashpot action so that a time delay ensues between the commencement of the flow and the time when the member reaches a position unrestricting the control port. At the termination of the flow of liquid this member (when the air content is again high) moves by gravity to a restricting position relative to the control port.

One form which the invention may assume is exemplified in the following description and illustrated by way of example in the accompanying drawing, in which the figure is a view in central vertical section through an apparatus embodying the preferred form of my invention.

Referring more particularly to the accompanying drawing, 10 indicates a housing or container which in this instance is cylindrical in form. Formed in the lower end of the housing coaxially thereof is an inlet port 11 which is intended to be connected to the discharge port of a liquid tank by means of a pipe 12. In one side of the housing 10 is formed an outlet port 14 which is intended to be connected with an air eliminator by means of a pipe 15. In view of the fact that fluid meters and air eliminators are old and well known in the art, they are not here illustrated.

Disposed intermediate the port 11 and the outlet port 14 is a flow control port 16. This port 16 is concentrically disposed relative to the inlet port 11 and the main chamber 17 of the housing, but is smaller in diameter than the chamber as illustrated. The outlet port 14 communicates with the main chamber 17 so that fluid entering the inlet port 11 must first pass through the control port 16 before reaching and discharging through the outlet port 14.

At the upper end of the main chamber 17 is a solid transverse partition wall 18 positioned short of the upper end of the housing 10. At a spaced distance above this wall 18 and secured at its perimeter to the housing 10 is a flexible diaphragm 19 also arranged transversely as illustrated. Secured at its upper end to the center of this diaphragm and depending downwardly is a needle valve 20 which is guided for vertical reciprocation in a fixed guide 21. The needle valve 20 is provided for the purpose of varying the effective area of an orifice 21a formed through the wall 18 and in communication with the interior of a dashpot cylinder 22. This dashpot cylinder 22 depends downwardly from the partition wall 18 into the main chamber 17, and is disposed concentrically with respect to the control port 16. The lower end of the dashpot cylinder is open as illustrated.

Fixed to the upper end of the housing over the diaphragm 19 is a head member 23 which is dished as illustrated to form an expansion chamber 24 between the head member 23 and the diaphragm 19. This chamber 24 is in communication with the inlet pipe 12 through the medium of a pipe 25 so that the inlet pressure of the liquid will be exerted against the diaphragm 19 and thereby automatically adjust the position of the needle valve 20 relative to the orifice 21a and thereby automatically vary the effective area of the orifice 21a as the pressure of the liquid delivered to the inlet port varies.

A manual adjustment of the needle valve 20 may be accomplished by means of an adjusting screw 26 carried by the head member 23.

Arranged in the housing 10 is a hollow piston 27 preferably of very light construction. The lower end of this piston 27 is closed and the upper end is open as illustrated. A dashpot plunger 28 is secured at its lower end to the lower end of the piston 27 and is rigidly disposed in the piston concentrically thereof. The upper end of the dashpot plunger 28 reciprocably projects within the dashpot cylinder 22. This, as will be described, provides a dashpot action for retarding the upward movement of the piston and also provides a guide for the upward movement of the piston.

The closed lower end of the piston 27 projects concentrically and downwardly through the control port 16 to a point closely adjacent to the inlet port 11, but is held spaced from this port by lugs 29. The piston 27 is of a diameter less than the diameter of the control port 16 so that when in its lowermost or normal position, it does not shut off the flow of fluid from the inlet port to the outlet port through the control port, but merely restricts such flow. Consequently, in order that it will not restrict the flow of liquid through the control port 16, the piston must be raised to a position such as illustrated in broken lines in the drawing so that where the effective area of the control port 16 at least equals the effective area of the inlet port 11. At this time the flow between the inlet port 11 and the outlet port 14 through the control port 16 will be unrestricted.

Forming a communication between the space intermediate the diaphragm 19 and the wall 18 and the main chamber is an open-ended tube 30, the upper end of which projects slightly above the wall 18 so as to maintain a liquid seal about the orifice and needle valve. This tube provides a means for enabling the escape of fluid from the space between the diaphragm 19 and the wall 18 into the main chamber, when the piston is elevated.

In operation of the device, the pipe 12 is connected to the discharge port of a tank and the pipe 15 is connected to the air eliminator. When the meter commences operating to permit fluid to flow to the air eliminator, the piston 27 will be in the position shown in the drawing. In view of the fact that upon the commencement of the meter operation the proportion of air to liquid is comparatively high, it is desired to retard the flow of the fluid to the air eliminator. By this means an air eliminator containing a relatively small volume of liquid may be used.

The reason is that when using an air eliminator containing a relatively small volume of fluid, the liquid from the meter passes through the air eliminator very rapidly, and if a high proportion of air is contained in the liquid, the air eliminator does not have sufficient time within which to properly eliminate it, but by retarding the flow of fluid to the eliminator during the periods when the air content is high, the eliminator has ample opportunity within which to properly effect elimination. Therefore, when the liquid first commences to flow and the air content is high, the liquid impinges against the lower end of the piston 27 and commences to elevate the same. However, during this period of elevation, the flow is restricted due to the fact that only a restricted flow area is provided between the piston and the periphery of the control port 16. As the force of the fluid tends to elevate the piston, this elevating movement is yieldingly resisted by the dashpot action of the dashpot plunger 28 and cylinder 22, so that the piston rises comparatively slowly during the commencement of the flow from the meter.

The time period to elevate the piston to the point where the flow is unrestricted is computed so that it will not reach its unrestricting position until the liquid flow from the tank contains little or no air. During this period the air eliminator has had ample opportunity and time within which to eliminate the air.

It will be seen that this time period must vary with the pressure of the fluid from the tank. I accomplish this automatic variation by impressing the inlet fluid pressure on the diaphragm 19 so as to automatically vary the effective area of the orifice 21a as the inlet fluid pressure varies.

When the metering system is used in connection with a tank, when the tank commences to empty, the air content in the line again rises and my apparatus automatically restricts the flow due to the fact that when the air content rises, the piston 27, which will be filled with liquid, will lower, again restricting the flow through the control port so as to give the air eliminator additional time within which to eliminate the air.

It will be understood that in the operation of the device the hollow piston 27 and the dashpot cylinder 22 will become filled with fluid. Therefore, when liquid with no entrained air is flowing through the valve, the liquid contained in the piston and dashpot is of the same specific gravity as that flowing through the valve and will not exert a downward closing pressure on the valve, the flowing stream having only to overcome the weight of the metal of hollow piston and dashpot cylinder to maintain the full flow opening. However, when a mixture of liquid and air again enters the inlet 11, such mixture has a reduced specific gravity which is less than that of the liquid contained in the hollow piston and dashpot. Therefore, the weight of the liquid in the piston and dashpot will become effective to cause said piston to drop into the control port 16 and again throttle the flow to a reduced rate.

On the downward stroke of the piston 27, fluid may enter the plunger 28 and the cylinder 22 through the medium of a check valve 22a. This check valve 22a will remain closed, of course, during the upward movement of the piston due to the differential in pressure between the inlet pressure and the pressure created within the dashpot. To enable the escape of air from the top of the main chamber 17, I provide an outlet pipe 15a therefrom which is led to the air eliminator.

From the foregoing it is obvious that I have provided an extremely efficient and effective apparatus for the purposes set forth, and while I have shown the preferred form of my invention, it is to be understood that various changes may be made in its construction by those skilled in the art without departing from the spirit of the invention as defined in the appended claims.

Having thus described my invention, what I claim and desire to secure by Letters Patent is:

1. A device of the character described comprising a housing having an inlet port and an outlet port, said housing having a flow control port positioned interiorly thereof intermediate the inlet and outlet ports, a member associated with the control port and normally restricting liquid flow therethrough from the inlet to the outlet port to a predetermined minimum, said member being movable in response to a liquid flow into the inlet port to a position unrestricting the control port, means associated with said member yieldingly resisting said movement to cause a time delay between time of commencement of flow of liquid into the inlet port and time of unrestricting of control port, the resistance of said means being automatically varied by changes in the pressure of the fluid entering the inlet port.

2. A device of the character described comprising a housing having an inlet port and an outlet port, said housing having a flow control port positioned interiorly thereof intermediate the inlet and outlet ports, a member associated with the control port and normally restricting liquid flow therethrough from the inlet to the outlet port to a predetermined minimum, said member being movable in response to a liquid flow into the inlet port to a position unrestricting the control port, means associated with said member yieldingly resisting said movement to cause a time delay between time of commencement of flow of liquid into the inlet port and time of unrestricting of control port, the resistance of said means being automatically varied by changes in the pressure of the fluid entering the inlet port, and means for manually adjusting the resistance of said means.

3. A device of the character described comprising a housing having an inlet port and an outlet port, said housing having a flow control port positioned interiorly thereof intermediate the inlet and outlet ports, a hollow piston normally partially restricting the control port by extending axially through the same toward the inlet port, said piston being guided for movement along the line of flow of liquid through the inlet port, said piston having one end closed and presented for impingement of liquid entering the inlet port whereby the liquid will move said piston to a position unrestricting the control port, resistance means resisting such movement of the piston to cause a time delay between time of commencement of flow of liquid into the inlet port and time of its reaching a position unrestricting the control port, and means associated with the resistance means to automatically vary the same in proportion to changes in the pressure of the fluid entering the inlet port.

4. A device of the character described comprising a housing having an inlet port and an outlet port, said housing having a flow control port positioned interiorly thereof intermediate the inlet and outlet ports, a hollow piston normally partially restricting the control port by extending axially through the same toward the inlet port, said piston being guided for movement along the line of flow of liquid through the inlet port, said piston having one end closed and presented for impingement of liquid entering the inlet port whereby the liquid will move said piston to a position unrestricting the control port, the other end of the piston being open, a dashpot consisting of a dashpot plunger carried by the piston, a dashpot cylinder carried by the housing and into which said plunger projects, said cylinder having an orifice to permit the escape of fluid, said dashpot constituting resistance means yieldingly resisting movement of the piston by the flow of fluid to create a time delay between time of commencement of flow of fluid into the inlet port and the time the piston reaches a position unrestricting the control port.

5. A device of the character described comprising a housing having an inlet port and an outlet port, said housing having a flow control port positioned interiorly thereof intermediate the inlet and outlet ports, a hollow piston normally partially restricting the control port by extending axially through the same toward the inlet port, said piston being guided for movement along the line of flow of liquid through the inlet port, said piston having one end closed and presented for impingement of liquid entering the inlet port whereby the liquid will move said piston to a position unrestricting the control port, the other end of the piston being open, a dashpot consisting of a dashpot plunger carried by the piston, a dashpot cylinder carried by the housing and into which said plunger projects, said cylinder having an orifice to permit the escape of fluid, said dashpot constituting resistance means yieldingly resisting movement of the piston by the flow of fluid to create a time delay between time of commencement of flow of fluid into the inlet port and the time the piston reaches a position unrestricting the control port, and means automatically varying the effective area of said orifice in proportion to the pressure of the fluid entering the inlet port.

PAUL RENFREW.